& Film Corporation, New York, N. Y., a corporation of Delaware

No Drawing. Application March 9, 1951, Serial No. 214,828

12 Claims. (Cl. 260—591)

This invention relates to 2,2'-dihydroxy-4,4'-dialkoxybenzophenones and to a process of preparing the same.

Various organic compounds exhibit the power to absorb light rays within the band of 2900 to 3700 Å., and when uniformly distributed throughout a transparent plastic sheet, the resultant sheet acts as a filter for all the light rays passing through and will transmit only those waves which are not adsorbed by the sheet and/or the absorbing agent. Thus, it is possible to screen out undesirable light rays and utilize the resulting filter in many technical and commercial applications, such as wrapping tissues for food products and the like.

Many organic compounds, such as 2,4'-dihydroxybenzophenone, 2,5 - dihydroxybenzophenone, 4,4' - dihydroxybenzophenone, 2,2'-dihydroxybenzophenone, and the like, have been suggested as absorbents for ultraviolet light in various transparent plastic sheet materials and the stabilization of transparent plastics.

When 2,5-dihydroxybenzophenone is employed for the protection of polymeric vinylidene chloride products against darkening and embrittling effects of ultraviolet light, considerable discoloration of the product ensues. The 4,4'-isomer is completely ineffective when employed in the same products for the same purpose, and the 2,2'- and 2,4'-isomers are only slightly effective as ultraviolet absorbers. The latter isomer is ineffective in filter coatings prepared from lacquers containing a cellulose ester, since the filter has a cut-off at about 290 m$\mu$. In other words, the isomer absorbs none of the ultraviolet light beyond 330 m$\mu$ and, as a consequence, the filter containing it is practically transparent to all of the ultraviolet light which is normally present in sunlight at sea level.

2,2'-dihydroxybenzophenone is of limited value in certain types of transparent plastics. While it inhibits the physical breakdown of plastics and other materials in which it is incorporated, it is not satisfactory as a protective material against ultraviolet fading. In other words, this compound is not satisfactory as a protective material against ultraviolet light fading when employed in substantially colorless plastics, resins, film-forming materials, colored textiles, and the like. In some cases the colorless plastics and the likecoated with said materials containing this compound become colored after several months; in other cases slightly colored plastics or film-forming material is itself discolored when exposed to ultraviolet light; and, still in other cases the plastic or film-forming medium offers no protection to the colored object of its transmission of ultraviolet light.

I have discovered that 2,2'-dihydroxy-4,4'-dialkoxybenzophenones are not only compatible with various types of substantially colorless film-forming plastics, resin, gums, waxes, and the like to yield ultraviolet absorbing compositions, but that their efficiency at 400 m$\mu$ is about twelve times that of any other compound currently used as an ultraviolet absorbent.

Accordingly, it is an object of the present invention to provide 2,2'-dihydroxy-4,4'-dialkoxybenzophenones and the process of preparing the same.

Other objects and advantages will appear hereinafter.

The compounds contemplated herein are characterized by the following general formula:

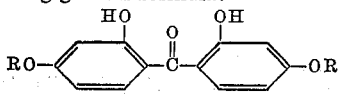

wherein R is alkyl, e. g., methyl, ethyl, propyl, isopropyl, butyl, isobutyl, amyl, isoamyl, hexyl, heptyl, octyl, octadecyl, lauryl, and the like.

The process involved in obtaining the foregoing compounds is carried out by first dissolving two mols of a resorcinol dialkyl ether, such as 1,3-dimethoxybenzene, 1,3-diethoxybenzene, 1,3-dipropoxybenzene, and the like, in a chlorine derivative of ethane, such as 1,1-dichloroethane, 1,2-dichloroethane, 1,1,1-trichloroethane, etc. The solution is cooled to 0° C., and a quantity, approximately equal to the weight of resorcinol dialkyl ether, of anhydrous aluminum chloride added with stirring and the temperature maintained around 0° to 4° C. Through this mixture a steady stream of phosgene is passed. After one to several hours, the temperature is permitted to rise to 8° to 12° C. for one hour, then 14° to 18° C. for three hours, and finally overnight at room temperature without phosgene flow. The resulting solution is warmed to 30° to 55° C. for three to six hours and decomposed with ice and hydrochloric acid. The organic layer is separated, extracted twice with 10% aqueous sodium or potassium hydroxide or any other suitable caustic alkali. The basic solution, after removal of residual solvent and acidification, yields a yellow solid which is recrystallized from a low boiling alcohol to yield the purified product.

Alternatively the compounds may be prepared by alkylating 1 mol of the tetraalkali metal salt of 2,2',4,4'-tetrahydroxybenzophenone with 2 mols of an alkyl halide, such as bromide, chloride, or iodide, preferably in the presence of an acid binding agent, such as sodium or potassium carbonate or hydroxide, triethylamine, pyridine, alkali metal alkoxides, such as sodium methoxide, sodium ethoxide, potassium propoxide, and the like. The acid binding agent is preferably dissolved in a lower alcohol, such as methanol, ethanol, and the like.

The starting material, 2,2',4,4'-tetrahydroxybenzophenone is prepared according to the procedure of Shoesmith et al., outlined in J. Chem. Soc. 125, 113 (1924). The tetraalkali metal salt is prepared by treating 2,2',4,4'-tetrahydroxybenzophenone with an alkali metal alkoxide, such as sodium or potassium methoxide, ethoxide, and the like, in a lower alcohol. The alkylation or condensation reaction is selective and takes place readily at room temperature. The alkylating reagents, i. e., alkyl halides may be any one of the large group available such as, for example, methyl, ethyl, propyl, isoamyl, hexyl, heptyl, lauryl, chlorides, bromides, or iodides, including the dialkyl sulfates, such as dimethyl sulfate, diethyl sulfate, etc.

The following examples illustrate the preparation of compounds of the foregoing formula, but it is to be clearly understood that they are not to be considered as being limitative.

*Example I*

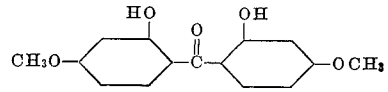

To a solution of 28 grams of resorcinol dimethyl ether in 200 cc. of ethylene dichloride, cooled to 0° C., were added 29 grams of anhydrous aluminum chloride. Through this mixture at 0° to 4° C. was passed a steady stream of phosgene. After one and one-half hours, the temperature was permitted to rise to 10° C. for one hour, then 16° C. for three hours, and finally overnight at room temperature without phosgene flow. The brown solution was then warmed to 40° to 50° C. for four hours and decomposed with ice and hydrochloric acid. The organic layer was separated, extracted twice with 100 cc. portions of 10% sodium hydroxide. This basic solution, after removal of residual solvent and acidification, yielded a yellow solid weighing 15 grams, which had a melting point of 90° to 110° C. One recrystallization from methanol raised the melting point to 134° to 136° C. Subsequent recrystallizations established the melting point of the pure product at 137 to 138° C.

Example II

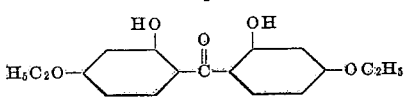

Example I was repeated with the exception that 28 grams of resorcinol dimethyl ether were replaced by 33.2 grams of resorcinol diethoxy ether. The product after recrystallization twice from ethanol was a yellow solid.

Example III

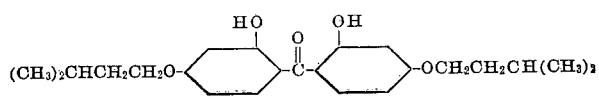

To a suspension of the tetrasodium salt of 2,2',4,4'-tetrahydroxybenzophenone prepared from 14.6 grams of tetrahydroxybenzophenone and 21.6 grams of sodium methoxide in ethyl alcohol were added 30.2 grams of isoamyl bromide. The product obtained after recrystallization from methanol was a yellow solid.

The corresponding 4,4'-diethoxy-, 4,4'-(dihexyloxy)-, and 4,4'-dioctyloxy)-benzophenones are also prepared as in Example III to yield yellow solids after recrystallization from methanol.

The 2,2'-dihydroxy-4,4'-dialkoxybenzophenones prepared in accordance with the present invention are unique in that they exhibit unusual ultraviolet transmitting properties when incorporated in any light transmitting carrier or composition without impairing the stability of the carrier or composition in which they are incorporated. As a consequence, they may be employed in a wide variety of carrier or filter medium, such as solutions or dopes of film-forming materials obtained by the polymerization of ethylene, styrene, vinyl chloride, vinyl ethers, vinyl esters, acrylic acids, cellulose esters, such as cellulose acetate nitrate, cellulose acetate butyrate, and the like. The compounds may also be dispersed in a lacquer or wax coating and in a transparent interlayer laminate of safety glass.

The following example illustrates the employment of the preparation of a transparent plastic containing a 2,2'-dihydroxy-4,4'-dialkoxybenzophenone.

Example IV

A cellulose acetate casting solution was prepared of the following composition:

|  | Per cent |
| --- | --- |
| Cellulose acetate (55% combined acetic acid) | 15.0 |
| Triphenyl phosphate | 3.7 |
| Methyl cellosolve | 28.69 |
| Absolute ethyl acetate | 38.21 |
| Absolute ethanol | 14.35 |

To the foregoing solution 0.6% of 2,2'-dihydroxy-4,4'-dimethoxybenzophenone was added with stirring until solution was complete. The solution was then spread on glass plates by means of a doctor blade whose opening was adjusted to produce the dry film with a thickness of 5 mils. The films were dried on the plate one day, stripped off, and hung in the air to dry for seven days. The optical density at various wavelengths was measured with the Cary Spectrophotometer before exposure and after exposure to the light of the Fade-ometer for 60 and 200 hours. From the Cary curves, the transmission curves were plotted from which it was clearly evident that the efficiency of the compound at 400 m$\mu$ is about twelve times that of any dihdroxybenzophenone currently employed as an ultraviolet absorbent material.

The advantage of 2,2'-dihydroxy-4,4'-dialkoxybenzophenones over closely related dihydroxybenzophenones is that films or foils containing the former absorb very little of visible light and, consequently, do not distort the color balance of the colored object wrapped in said film or foil.

While I have disclosed the preferred embodiments of my invention, it will be readily appreciated that many changes and variations may be made therein without departing from the spirit thereof. Accordingly, the scope of the invention is to be limited solely by the appended claims.

I claim:
1. 2,2' - dihydroxy - 4,4' - dialkoxybenzophenone characterized by the following formula:

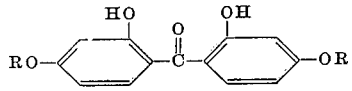

wherein R represents an alkyl group.

2. 2,2'-dihydroxy-4,4'-dimethoxybenzophenone having the following formula:

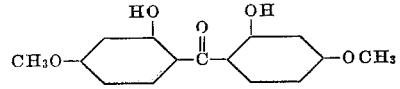

3. 2,2'-dihydroxy-4,4'-dipropoxybenzophenone having the following formula:

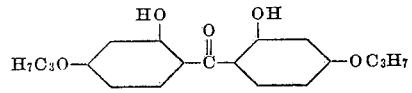

4. 2,2' - dihydroxy - 4,4' - (diisoamyloxy)benzophenone having the following formula:

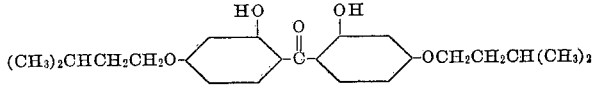

5. 2,2' - dihydroxy - 4,4' - diethoxybenzophenone having the following formula:

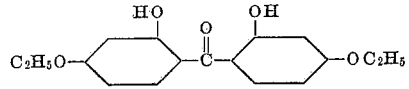

6. 2,2' - dihydroxy - 4,4' - dihexyloxybenzophenone having the following formula:

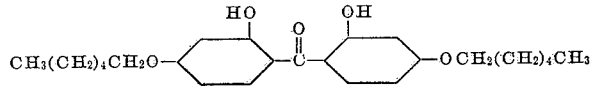

7. The process of preparing 2,2'-dihydroxy-4,4'-dialkoxybenzophenones which comprises condensing two mols of resorcinol dialkyl ether with one mol of phosgene in the presence of two moles of aluminum chloride and in the presence of a chlorinated hydrocarbon selected from the group consisting of 1,1-dichloroethane, 1,2-dichloroethane and 1,1,1-trichloroethane at a temperature ranging between 4° and 55° C., decomposing the aluminum chloride complex formed with ice and hydrochloric acid, separating the organic layer and extracting with caustic alkali, and acidifying the alkaline solution to yield said benzophenone.

8. The process of preparing 2,2'-dihydroxy-4,4'-dimethoxybenzophenone which comprises condensing two mols of resorcinol dimethyl ether with one mol of phosgene in the presence of two moles of aluminum chloride and in the presence of ethylene dichloride at a temperature ranging between 4° and 55° C., decomposing the aluminum chloride complex formed with ice and hydrochloric acid, separating the organic layer and extracting with caustic alkali, and acidifying the alkaline solution to yield said benzophenone.

9. The process of preparing 2,2'-dihydroxy-4,4'-dipropoxybenzophenone which comprises condensing two mols of resorcinol dipropoxy ether with one mol of phosgene in the presence of two moles of aluminum chloride and in the presence of ethylene dichloride at a temperature ranging between 4° and 55° C., decomposing the aluminum chloride complex formed with ice and hydrochloric acid, separating the organic layer and extracting with caustic alkali, and acidifying the alkaline solution to yield said benzophenone.

10. The process of preparing 2,2'-dihydroxy-4,4'- (diisoamyloxy)benzophenone which comprises condensing two mols of resorcinol diisoamyl ether with one mol of phosgene in the presence of two moles of aluminum chloride and in the presence of ethylene dichloride at a temperature ranging between 4° and 55° C., decomposing the aluminum chloride complex formed with ice and hydrochloric acid, separating the organic layer and extracting with caustic alkali, and acidifying the alkaline solution to yield said benzophenone.

11. The process of preparing 2,2'-dihydroxy-4,4'-diethoxybenzophenone which comprises condensing two mols of resorcinal diethyl ether with one mol of phosgene in the presence of two moles of aluminum chloride and in the presence of ethylene dichloride at a temperature ranging between 4° and 55° C., decomposing the aluminum chloride complex formed with ice and hydrochloric acid, separating the organic layer and extracting with caustic alkali, and acidifying the alkaline solution to yield said benzophenone.

12. The process of preparing 2,2'-dihydroxy-4,4'-dihexyloxybenzophenone which comprises condensing two mols of resorcinol dihexyloxy ether with one mol of phosgene in the presence of two moles of aluminum chloride and in the presence of ethylene dichloride at a temperature ranging between 4° and 55° C., decomposing the aluminum chloride complex formed with ice and hydrochloric acid, separating the organic layer and extracting with caustic alkali, and acidifying the alkaline solution to yield said benzophenone.

References Cited in the file of this patent

FOREIGN PATENTS

| Number | Country | Date |
|---|---|---|
| 899,334 | France | Aug. 7, 1944 |

OTHER REFERENCES

Staudinger et al., Helv. Chim. Acta., vol. 4, pages 334–342 (1921).

Shoesmith et al., J. Chem. Soc., vol. 125, pages 113–115 (1924).

Stromberg et al., Chemical Abstracts, vol. 41, cols. 5479, 5480 (1947).

Beilstein, "Handbuch der Org. Chim.," 4th ed., vol. II, page 542, supp. 2, page 590.